H. MOE.
EGG BOILER.
APPLICATION FILED MAY 31, 1913.

1,149,590.

Patented Aug. 10, 1915.
2 SHEETS—SHEET 1.

WITNESSES
M. C. McInnis
G. E. Sorensen

INVENTOR
HERMAN MOE
BY
Paul & Paul
ATTORNEYS

H. MOE.
EGG BOILER.
APPLICATION FILED MAY 31, 1913.
1,149,590.
Patented Aug. 10, 1915.
2 SHEETS—SHEET 2.
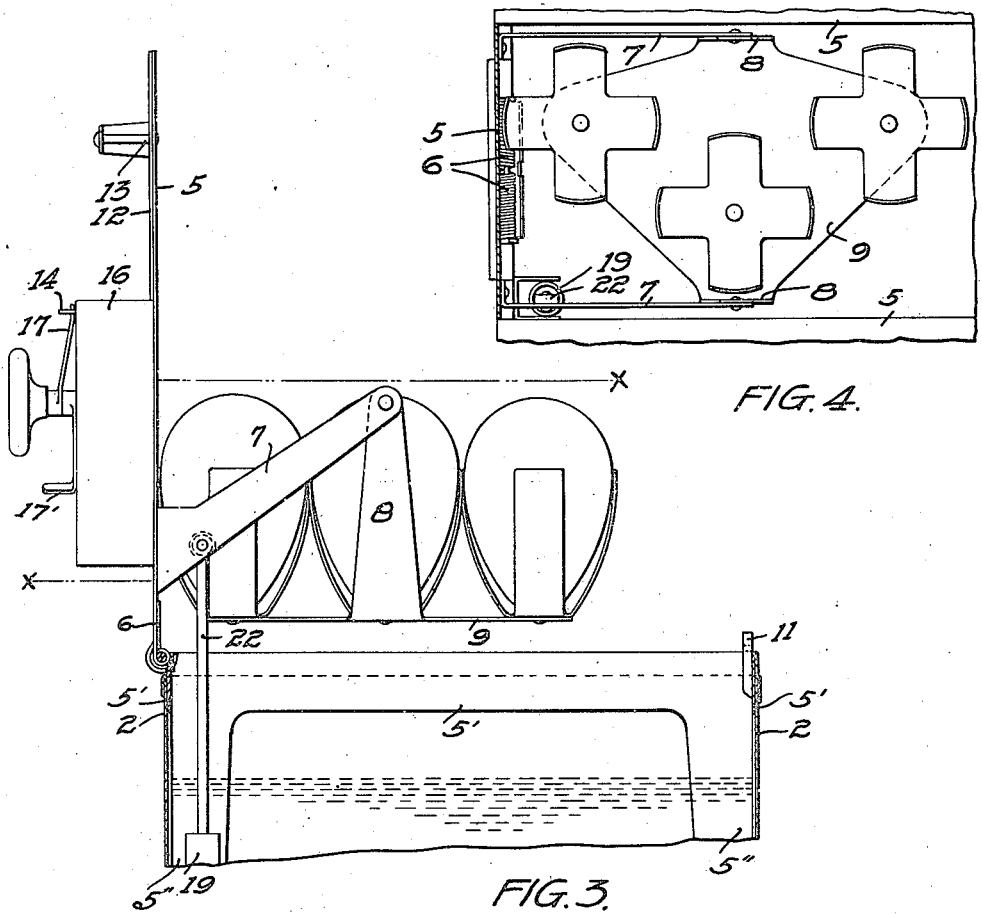
FIG. 4.
FIG. 3.
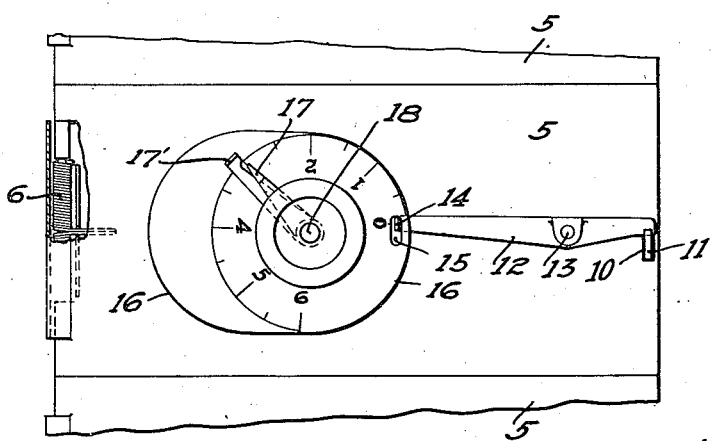
FIG. 5.
WITNESSES
M. R. McInnis
G. E. Sorensen
INVENTOR
HERMAN MOE
BY
Paul Paul
ATTORNEYS

UNITED STATES PATENT OFFICE.

HERMAN MOE, OF MINNEAPOLIS, MINNESOTA.

EGG-BOILER.

1,149,590.  Specification of Letters Patent.  Patented Aug. 10, 1915.

Application filed May 31, 1913. Serial No. 770,907.

*To all whom it may concern:*

Be it known that I, HERMAN MOE, a citizen of the United States, resident of Minneapolis, county of Hennepin, State of Minnesota, have invented certain new and useful Improvements in Egg-Boilers, of which the following is a specification.

My invention relates to devices for boiling eggs adapted particularly for hotels, clubs, and restaurants, where it is desirable to boil a number of eggs simultaneously and for varying periods of time.

A further object is to provide a means for regulating the movement of the egg carrier during the operation of raising the eggs out of the boiling water.

Other objects of the invention will appear from the following detailed description.

The invention consists generally in various constructions and combinations, all as hereinafter described and particularly pointed out in the claim.

Figure 1:
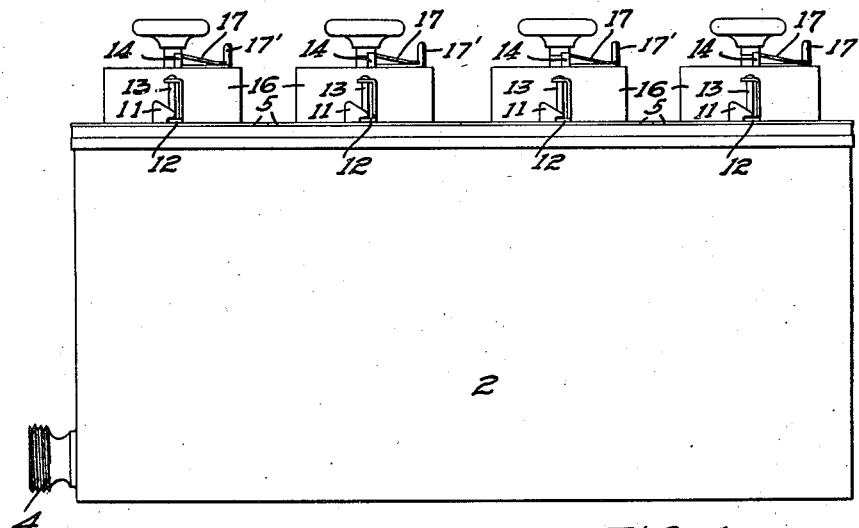
Figure 2:
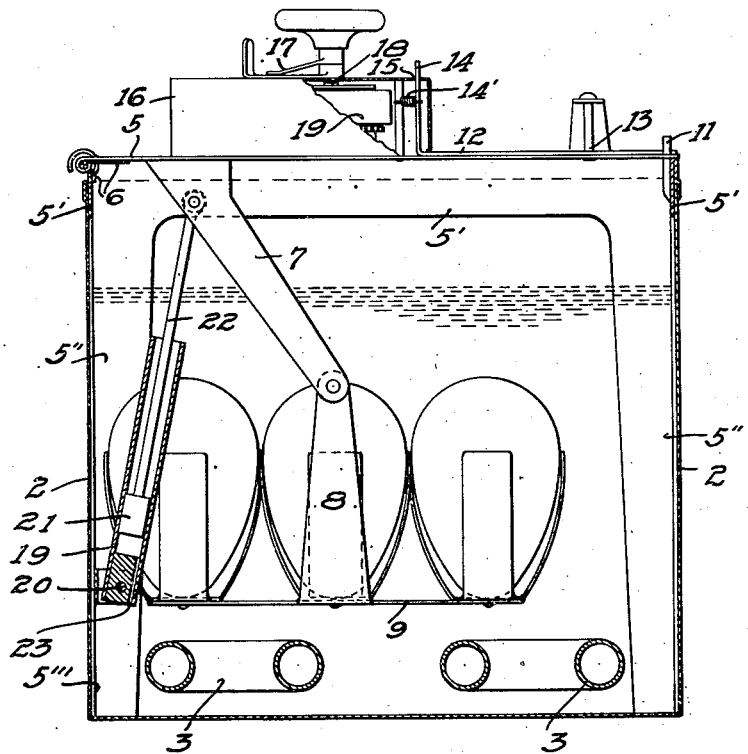

In the accompanying drawings forming part of this specification, Figure 1 is a side view of an egg boiler embodying my invention, Fig. 2 is a transverse vertical sectional view of the same, Fig. 3 is a sectional view, showing the egg carrier in its raised position, Fig. 4 is a plan section on the line *x—x* of Fig. 3, Fig. 5 is a plan view, showing the timing mechanism provided in connection with each carrier.

In the drawing, 2 represents a tank adapted to contain a supply of water and having heating coils 3 in the bottom thereof and a pipe connection 4 at one end communicating with the coils. The cover for this tank is divided into a series of sections, and as they are all alike and equipped with a timing mechanism and egg carrier, I will refer to one of the cover sections and the parts connected therewith by suitable reference numerals, it being understood that the other cover sections are of corresponding construction and the parts connected therewith operate in substantially the same way. I have shown four of these section, but a greater or less number may be provided, according to the desired capacity of the boiler.

5 represents a cover section, normally held in its raised or vertical position by a spring 6. I prefer to mount all of the covers and their connections upon a frame 5', rectangular in form, fitting within the tank 2 and having suitable legs 5' which rest upon the bottom of the tank. This construction allows the covers and the egg carriers to be inserted into any suitable receptacle containing hot water. Hangers 7 depend from the cover 5 on each side thereof and are pivotally connected at their lower ends to arms 8 which support the egg carrier 9 having a series of pockets in which the eggs are placed. The cover is provided with a notch 10 therein to receive a hook 11 carried by the frame 5'. A latch 12 is pivoted at 13 on the cover and has one end adapted to enter the notch in the hook 11 and lock the cover in its closed position. The other end of the latch 12 has a turned up end 14 which projects into a slot 15 in a disk 16 having graduations on its upper surface indicating the minutes and fractions thereof. A spring 14' normally tends to hold the latch in its locking position. A arm 17 is mounted on a post 18 of a clock mechanism 19 of ordinary construction that is adapted to swing the arm 17 into contact with the end 14 and disengage the latch 12 from the hook 11 and release the cover after a predetermined period of time. Evidently, the greater distance the arm 17 is moved from the end 14, the longer the period of time will be before the latch is tripped and the cover released. This is a construction common to egg boilers and I make no claim to the same broadly herein. I prefer also to provide an arm 17' that is adapted to move over the graduations and will remain stationary when set to indicate the number of minutes the eggs have cooked after the cover has been released and the carrier raised.

Evidently, when the latch 12 is operated and the cover released, its spring will throw the cover quickly to an upright position, lifting the egg basket out of the water and the sudden stopping of the cover might discharge the eggs from their pockets. I therefore prefer to provide means for regulating the travel of the cover, causing it to rise slowly and stop without a jerk. This means preferably consists of a cylinder 19 pivoted at 20 on a leg 5''' within the tank and having a plunger 21 provided with a rod 22 that is pivotally connected to the upper portion of one of the hangers 7. The lower end of the cylinder has a port 23 therein through which the water is drawn upon the upward movement of the plunger, and the upper end of the cylinder being immersed in the water, the device will act as a retarding means to hold the cover and prevent it from rising too quickly when released. The water accumulating in the cylinder will be discharged through the port 23 when the plunger is forced down upon the closing of the cover. I have found with this construction that the cover, when released, will swing slowly and smoothly to an open position, lifting the carrier and the eggs out of the water without displacing them from their pockets.

I claim as my invention:—

The combination with a receptacle adapted to contain a supply of water, of a frame comprising an upper horizontal portion fitting within said receptacle and bearing on the inner walls thereof and having legs resting upon the bottom of said receptacle, a cover hinged to said frame on one side and having a spring for normally holding said cover in its raised position, an egg carrier pivotally supported on the underside of said cover and adapted to swing to a substantially horizontal position within said receptacle when said cover is lowered to close the top of said receptacle, means connected with said cover for retarding the opening movement thereof and the lifting of said egg carrier, means for locking said cover in its closed position, and a timing device in connection with said locking means for releasing it to allow said cover to swing to its raised position after a predetermined interval, said frame and cover, with the parts connected thereto, being removable from said receptacle.

In witness whereof, I have hereunto set my hand this 21st day of May 1913.

HERMAN MOE.

Witnesses:
 GENEVIEVE E. SORENSEN,
 EDWARD A. PAUL.